United States Patent [19]

Hjortendal et al.

[11] 3,993,871

[45] Nov. 23, 1976

[54] RELAY MATRIX FOR SELECTOR NETWORKS

[75] Inventors: Royne Gunnar Hjortendal, Sorunda; Jöns Kurt Alvar Olsson, Tullinge, both of Sweden

[73] Assignee: Telefonaktiebolaget L M Ericsson, Stockholm, Sweden

[22] Filed: May 29, 1975

[21] Appl. No.: 581,932

[30] Foreign Application Priority Data

June 10, 1974 Sweden .............................. 7407637
May 20, 1975 Sweden .............................. 7505731

[52] U.S. Cl. .......................................... 179/18 GF
[51] Int. Cl.² .......................................... H04M 3/00
[58] Field of Search ................... 179/18 GF, 18 GE; 340/166 S, 166 R

[56] References Cited
UNITED STATES PATENTS 3,235,668    2/1966    Abbott .......................... 179/18 GE
3,838,227    9/1974    Danielsen ....................... 340/166 S

*Primary Examiner*—Thomas A. Robinson
*Attorney, Agent, or Firm*—Hane, Baxley & Spiecens

[57] ABSTRACT

A relay matrix, especially a reed relay matrix for selectors in telephone exchanges, consists of a crossing point network, i.e. relays arranged in rows and columns constituting switching elements of speech paths, control unit and holding units common to such a network. The relays of the crossing point network are of the monostable reed-relay type. The through connection is of the two pole type i.e. each crossing point comprises just two make contacts. The wire connection between the matrices in the selector is limited to the speech wires since a continuous holding wire is not utilized. Addressing of the crossing points in a connection is carried out by means of a central processor by the setting up of a connection as well as by the releasing of the connection.

12 Claims, 11 Drawing Figures

HOLDING UNIT HU

HOLDING UNIT HU'

RELAY MATRIX FOR SELECTOR NETWORKS

The invention relates to a relay matrix, especially a reed relay matrix for selector networks in telephone exchanges comprising stages of relay matrices. Different kinds of reed relay matrices are previously known and their operation may be effected in several different ways. It is known to arrange bistable electromagnetic reed relays in the crossing points of the matrix and to operate these by the current coincidence of a row- and a column wire. However, this arrangement has a disadvantage in that the bistable electromagnetic relays and their operation is relatively complicated and expensive. In another known solution each of the monostable relay units in the matrix is provided with contacts for the speech wires as well as with an extra contact unit serving as a holding contact for the relay. Such a solution is shown for instance in the German patent application, as published for opposition, No. 1,047,851. This solution has the disadvantage of requiring an extra reed contact plus a diode in each crossing point as well as end-to-end holding wires between the selector stages of the telephone exchange.

An object of the present invention is to achieve an improved relay matrix being which is considerably cheaper and more compact than the earlier known devices.

The invention is described more in detail below by means of several embodiments with reference to the accompanying drawings. In the drawing.

In the following description it is assumed that the relay matrices form parts of selectors for telephone exchanges. This naturally does not imply any limitation of the field of application of the invention.

The condition of the shown example is never to let more than one crossing point relay of the matrix per row be operated at any one time. In the other coordinate direction of the matrix, here defined as the column direction, it shall be possible to enter the circuit under certain circumstances for instance in case of conference calls. This means that one or several subscribers or an operator shall have the possibility of entering a call and when doing so it shall be possible to have two or several crossing point relays in the same column of the matrix operated at the same time. The conditions concerning the row make it possible to have only one control device per row if each crossing point relay in the row is provided with a holding device of its own. All control devices for one card, which according to the embodiment is equivalent to an 8×8 matrix are brought together to one control unit, which in integrated technique is realized in one casing. The holding devices which are combined row by row to holding units are realized in a common casing per unit.

Figure 1:
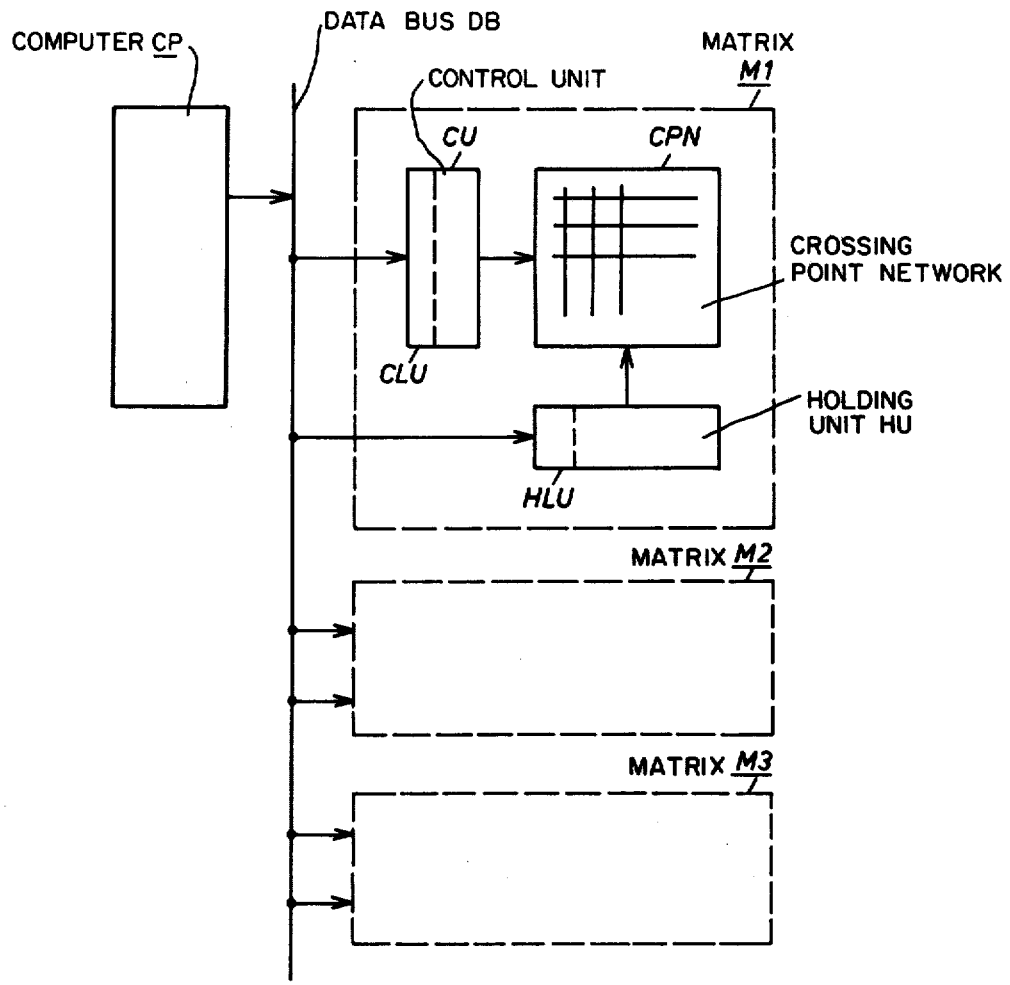
FIG. 1 is a block diagram of three matrices forming part of a selector stage and the supervising central processor.

FIG. 1 shows a block diagram of three matrices forming part of a selector stage and the supervising central processor. The matrices M1, M2, M3 are addressed through the commun databus DB from the controlling and supervising central processor CP. Each matrix consists of the crossing point network CPN and the control unit CU and the holding unit HU common for this network. The crossing point network comprises the switching devices of the different speech paths, in this embodiment consisting of monostable reed relays controlled by a magnetizing coil. The through-connection is bipolar, i.e. each crossing point only comprises two make contacts and consequently there is neither an electromagnetic- nor an electromechanical holding contact. The control unit CU common to the matrix is as far as functions are concerned divided into two units, a control logic unit CLU which is addressed from the central processor CP and the voltage supply unit. Below the control unit will be described as a unit without dividing into above mentioned parts. As far as functions concerned, the holding unit HU common for the matrix also divided into two parts, one holding logic unit HLU and the circuit for the connection to a voltage. Below, however, the holding unit will also be described all together without dividing into such functions.

It is understood that the central processor CP also controls the other selector stages of the exchange. Furthermore, the different selector stages may be arranged in many different ways and the shown example is only one of several embodiments.

Figure 2:
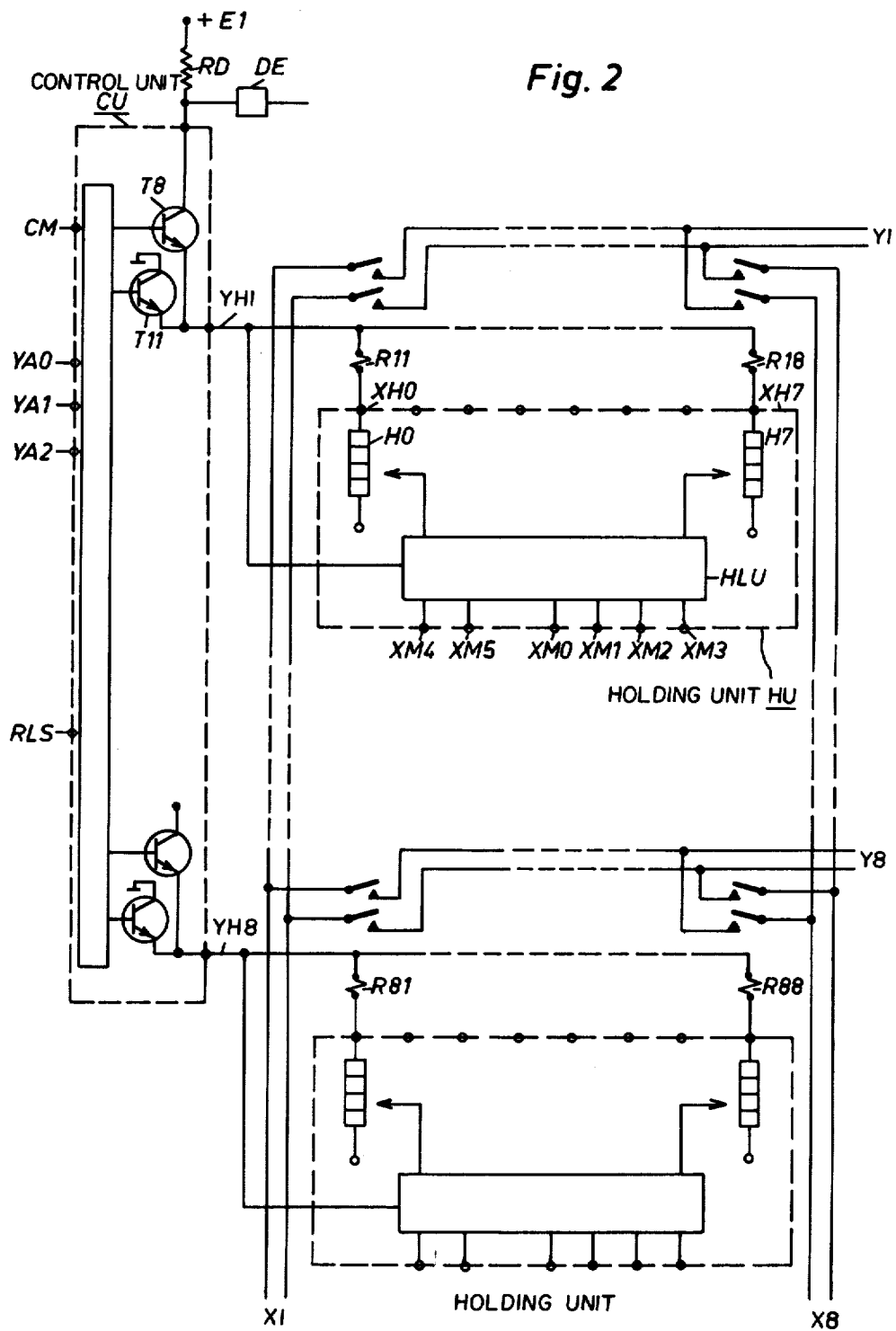
FIG. 2 is a diagram of a relay matrix in a selector stage.

FIG. 2 schematically and synoptically shows a relay matrix according to FIG. 1 and the associated control unit CU as well as holding units HU. This relay matrix forms part of a selector stage. The shown crossing point network contains 64 relays arranged in 8 rows, each row consisting of 8 relays. Only the first and the last relays of the rows 1 and 8 have been shown. The rows in between, which are not shown, have holding units of their own but make use of the same control unit CU. The relays are marked with R followed by a two-figure index the first figure of which indicates a row and the second figure a column. In the shown example the crossing point network with the control unit as well as the holding units are mounted on one common printed circuit card and thus forms one unit. In a selector network with several stages each selector stage comprises one or several matrices of the shown type. As already mentioned the crossing point relays are provided with bipolar make contacts which can connect the speech wires in a row to corresponding wires in a column in the crossing points. An input of the matrix, i.e. the speech wires belonging to a column X1–X8, are connected to an output of the matrix, i.e. the speech wires of a row Y1–Y8 by operation of the corresponding crossing point's relay. This is carried out by means of a pulse shaped operating signal from the control unit CU. Thereafter the relay is kept operating by means of a special holding circuit arrangement. The electronic control unit CU of the relay matrix receives information from the central processor CP concerning the row of the crossing point network in which the relay that is to be operated and released respectively is to be found. By means of a signal to the holding units HU, a column in the crossing point network is addressed correspondingly. The control logic of the control unit is addressed from the central processor with an address of binary form. One bit in said such address fed to the card mark input CM chooses control unit, i.e. card in the selector stage, three bits in such address on the row mark inputs YA0–YA2 constitute a partial address which chooses a control circuit within the control unit, i.e. a row in the crossing point network of the chosen matrix. A further bit in such address on the control input RLS indicates whether "operation" or "release" shall be done.

Similarly, the holding unit HU is addressed from the central processor CP for the choice of a holding circuit associated with a relay within the chosen row. This unit is addressed by means of a 6-bit address fed to inputs XM0 to XM5. In the shown example the address is divided into two parts. The first part is composed of two bits and the second of the remaining four bits. This type of address has been chosen in order to use a simple decoding logic. The last mentioned way of addressing is more fully described below.

The eight pairs of speech wires X1–X8 constituting the inputs of the considered matrix are connected to the inputs of the exchange or to speech wires Y1–Y8, i.e. the speech wires of the rows in the preceding selector stage. Analogously, the outputs of the matrix i.e. the eight pairs of speech wires Y1–Y8, are connected to the inputs of a matrix in the following stage. Voltages for the activating, holding and releasing of a relay in the desired row can be selectively fed from the control unit CU to the row wires YH1–YH8 of the crossing point network. This has been indicated to in FIG. 2 by means of the transistors T8 and T11, which are arranged in pairs for each row and which are controlled from the logic of the control unit as will be more fully described below. The transistor T8 feeds, when conducting, substantially the voltage +E1 to the row wire YH0 for operating a relay in the corresponding crossing point row. As indicated with the resistor RD in series with the operating voltage source +E1 a current dependent voltagedrop for detection is created. A detector DE determines whether the operating current is within a given, allowed range. An embodiment of a suitable detecting circuit said will be more fully described below.

The holding units HU, each associated with a row of the crossing point network, contain, as is schematically indicated, several holding devices HO–H7 specifically being realized by means of thyristors or bipolar thyristor equivalents. In FIG. 2 it is indicated that such devices consist of controlled four layer semiconductors but hereinafter these devices will be shown and referred to as thyristor equivalents in bipolar technique.

Figure 3:
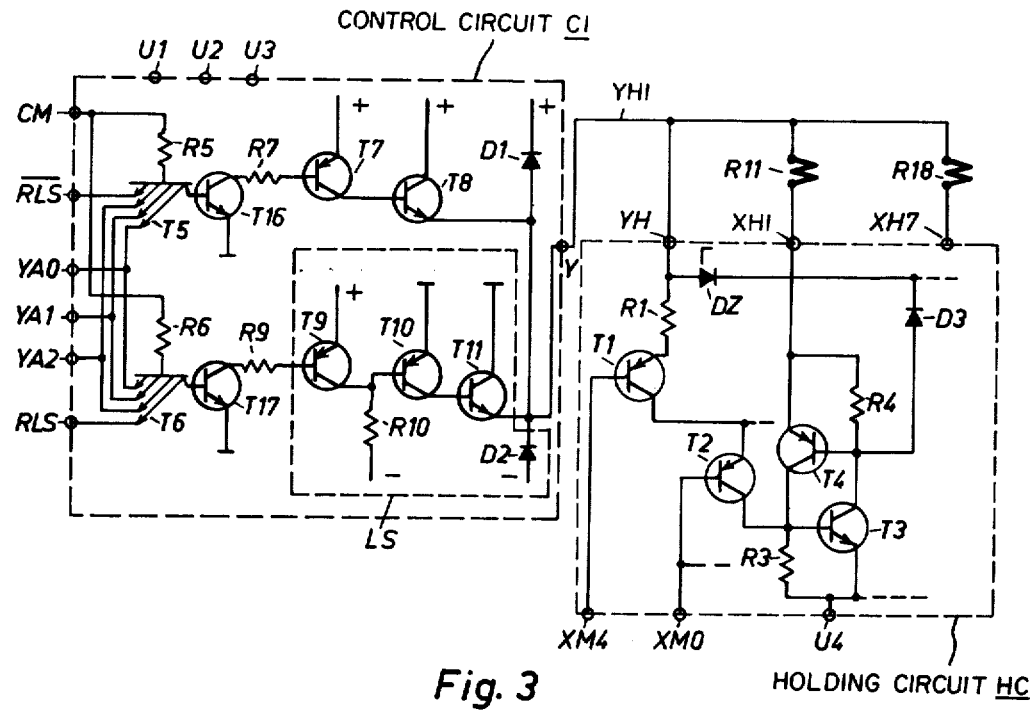
FIG. 3 is a circuit diagram of the parts in a control unit and a holding unit associated with a crossing point.

FIG. 3 shows in greater detail how a control circuit C1, i.e. the part of the control unit CU according to FIG. 2 that is associated with the first row of the matrix, can be realized. It has already been mentioned that a holding unit is common to all relays in a row and in FIG. 3 a holding circuit HC is shown, i.e. the part of a holding unit HU that is associated to a single relay device of the row. The control unit CU common to the whole matrix also contains seven other identical control circuits C2–C8, one for each of the rows 2 to 8 respectively in the matrix. Each of the crossing point relays R11–R18 has one of its terminals connected to the row conductor YHO belonging to row N0 0 in the crossing point network and a second terminal respectively connected to a corresponding relay connection terminal XH0–XH7 on the holding unit HU associated to with the row. The control circuit C1 which forms part of the control unit CU and is associated to the row conductor YH1 has three voltage supply terminals U1, U2 and U3 for connection of external control voltages for operating and holding purposes. In the shown example these voltages are a positive voltage +E1, a negative voltage −E2 and 0 voltage as well. In addition of such voltage connection terminals on the control circuit C1 there is a card mark input CM, three row mark inputs YA0, YA1, YA2 and two control inputs RLS and $\overline{RLS}$ respectively. The output Y of the control circuit CO is connected to the associated row wire YHO.

In order to provide a chosen row conductor, in this case the row conductor YH1 with operating voltage, a positive voltage, for instance the voltage +E1, is fed in response to an order from the central processor to the matrix and is distributed within the matrix to all card mark inputs CM of the control circuits C1–C8 in the control unit CU. By doing so one matrix card within the selector stage is chosen. To all the cards, i.e. matrices in the selector stage, an address is fed for marking the row within the matrix. Then this address is distributed to all control circuits C1–C8 within the control unit CU on the respective card. Each control circuit has, as in the shown example of the control circuit C1, three row mark inputs YA0–YA2. The binary address for the chosen row is fed to these inputs and coded in such a way that the control circuit for the chosen row receives high level on all its row mark inputs while the rest of the control circuits of the card receive an address with low level on at least one of the row mark inputs. Hence, at the same time as in this case the row conductor YH1 is marked, the corresponding row in all the matrices belonging to the same selector stage is also marked. Within the selector stage, however, only one card receives at the same time a positive voltage +E1 on the card mark input CM. There are two different ways of controlling. (1) Either activating, which includes a following connection of holding voltage, or (2) release. A choice between these two possibilities is made by implying low or high voltage respectively on the control input RLS.

In principle the control circuit, is composed of two identical decoding circuits which are fed in parallel with all the input signals to the control circuit. Each decoding circuit is composed of a multi-emitter-transistor T5, T6, followed by a NPN–PNP–transistor combination T16 and T7 in one case and T17 and T9 in the other case. The multi-emitter-transistor is of NPN–type. The decoding circuit can be considered as an AND-circuit with four inputs using the emitters of the transistor T5, T6 as inputs. The binary output, i.e. the collector of such NPN-transistor thus only takes its high level when all the inputs have a high level. The decoding circuit for the activating, which is the upper decoding circuit in FIG. 3, directly controls with its output an operation device here shown as a NPN-transistor T8, the collector of which is fed with the operation voltage +E1 from the voltage feeding terminal U1. The corresponding decoding circuit for release controls with its output a level changing stage consisting of a PNP–NPN–transistor combination T10 and T11.

If it is assumed that the control circuit considered in this example has been addressed for operation of a device in the associated row 1, then a positive voltage, for instance, the voltage +E1 has been fed to the card mark input CM. Positive voltages corresponding to a binary one have also been fed to all row mark inputs YA0, ..., YA2 and a voltage of 0 volt corresponding to a binary zero has been fed to the control input RLS. Then the inverted control input $\overline{\text{RLS}}$ has a high potential corresponding to a binary one. Thus all inputs to the decoding circuit, i.e. on the emitters of the multi-emitter-transistor receive voltages corresponding to a binary one. Accordingly, with the base positive, the transistor T5 is blocked or cut off in this position state. The base-collector-diode, however, conducts current to the base of the subsequent NPN-transistor T16. This transistor conducts and transfers the potential of the grounded emitter to the base of the following PNP-transistor T7. This transistor in its turn becomes conducting and transfers the potential +E1 of its emitter to the collector. Thus the operation device T8 receives a high potential on its base and conducts the operation voltage +E1 to the output Y of the control circuit C1.

Considering the fact that, the control input RLS has a low level according to the above the multi-emitter-transistor T6 forming part of the decoding circuit for release, i.e. the lower decoding circuit in the shown example, will be conducting. The low potential of the control input will then be transferred to the transistor's collector. Analogously according to the above it is apparent that the output transistor T9 of the decoding circuit is cut off and that the output voltage from the decoding circuit is low. In this situation the potential on the following PNP-transistor is reduced below zero level by means of the resistor R10 and the voltage source −E2. The PNP-transistor T10 conducts and by doing so raises the potential of the base of the following transistor T11. However, according to the above the voltage on this transistor's emitter, being directly connected to the output Y of the control circuit C1, is equal to the operation voltage +E1 and consequently the NPN-transistor T11 in the level changing step will be kept cut off. However, as the marked relay has operated with assistance from the holding circuit described below, the control unit is transferred to holding state by reducing the voltage of the card mark input CM to 0 volt. By this measure the operation device, the transistor T8, is cut off and the NPN-transistor T11 in the level changing stage becomes conducting. The potential 0 volt is transferred from its collector to its emitter and further to the output from the control circuit C1.

The diodes D1 and D2 connected to the output Y of the control circuit insure, together with the connected voltage sources +E1 and −E2, that the voltage of the output never exceeds +E1 and never is lower than −E2, respectively.

In FIG. 3, as earlier mentioned, the parts of the holding unit HU associated with a crossing point in the crossing point network, in this case the crossing point 11 with the coil of relay R11, are also shown. This part of the holding unit is from now on called a holding circuit HC and in the Figure it is shown within a dashed frame. The dashed conductor symbols within the frame indicate connection points for further holding circuits for relays R12, R13, ..., R18 within the unit. The holding device in the circuit has been drawn as a two-transistor bipolar thyristor equivalent comprising the transistors T4 and T3 with the base-emitter resistors R4 and R3 respectively. The considered holding circuit within the holding unit is addressed as earlier mentioned on a number of relay mark inputs XM0–XM5. As earlier mentioned, the address is divided into two parts. A first part consists of two bits to the relay mark inputs XM4 and XM5. These bits indicate to which of a first and a second group respectively, each consisting of four relays, the relay referred to belongs. The remaining four relay mark inputs XM0–XM3 address a chosen relay within the group. In the example according to FIG. 3 the relay mark inputs XM4 and XM0 represent the inputs for the marked relay. This means that the voltage fed to these inputs is charged from the rest potential +E1 to the operation voltage 0 volt in marking state.

According to what is mentioned above the row conductor YH1 has the voltage +E1 in marking state. The emitter of the transistor T1, which through the resistor R1 is connected to the row conductor via the input YH of the holding circuit accordingly receives a high level and the transistor T1 whose base is at a low voltage conducts current to the emitter of the subsequent transistor T2. This transistor because of the low-voltage on input XM0 due to the addressing has a low base voltage. Therefore this transistor also conducts. Thus the NPN-transistor T3 in the thyristor equivalent receives control current, and therefore the thyristor becomes conducting and draws current through the coil of relay R11, the relay connection terminal XH1 and towards the voltage source −E2 connected to the voltage feeding terminal U4. Thus the operating current through the relay coil R11 increases and is related to voltage difference between the voltages +E1 and −E2. When a change to holding the state occurs according to what is said above, the relay R11 is kept operating between the voltage 0 volt of the row conductor YH1 and the voltage source −E2.

When releasing, the relay, the control circuit C1 is addressed in the same way as earlier except that the control input RLS now receives a signal with high level. This causes the transistor T6 to be cut off, and consequently, according to the earlier discussion, the transistor T11 is cut off. Hence the holding circuit of the relay R11 is broken and the relay reverts to the state of rest. Owing to the fact that the transistor T5 in the control circuit C0 is conducting when the circuit is addressed for releasing, the transistor T8, according to the earlier discussion will be cut off. In a first instant after release addressing of the control circuit C1 the relay coil thus will be short-circuited through the diode D2 and the thyristor. Now the current through the relay and the thyristor decreases towards zero and when this current falls below the holding current of the thyristor it will be cut off. The holding device being cut off, the current path for the relay current henceforth passes through the resistor R4, the diode D3, the Zener diode DZ and the input YH to the relay. The Zener diode DZ blocks this current path until the holding device has turned into an nonconducting state. In this connection it can be mentioned that the most important reason for using thyristors for the holding function is that the circuit can be given high noise immunity without additional components as for instance capacitors. The inductance namely prevents the current from changing instantaneously below or above the holding current value of the thyristor during a short disturbance. With the amplitudes existing in the disturbing sources, for instance lightning disturbance 800 volts during 10 microseconds or the breaking of a ringing signal of 90 volts with a relay contact, it will be difficult to prevent disturbances from effecting the circuits with reasonable means. However, the disturbances do not have any effect, as the thyristor, after one disturbance, reverts to its former state.

Figure 4:
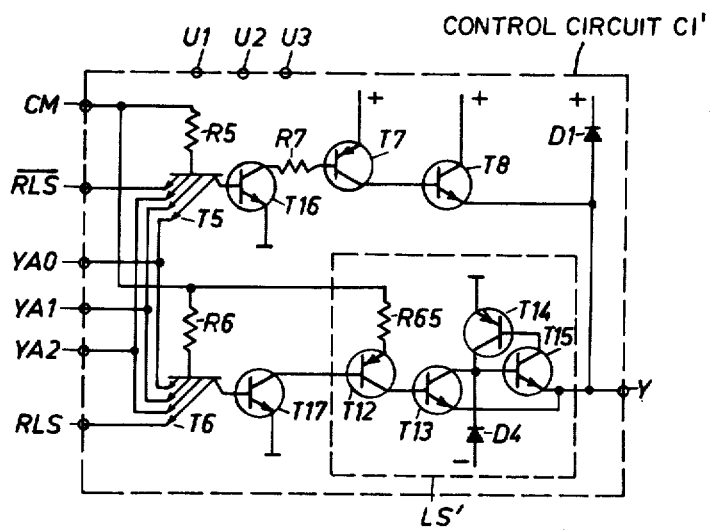
FIG. 4 is a circuit diagram of a second embodiment of the control circuit.

In FIG. 4 a circuit diagram of a second embodiment of the control circuit C1' is shown. The difference between this embodiment and the already described centers around the level changing stage LS which is controlled by the decoder for disconnection.

In FIG. 4 a circuit diagram of a second embodiment of the control circuit is shown. As earlier the base-emitter resistors of the thyristor equivalent are not drawn. The decoding procedure and the applying of operation voltage are the same as in the arrangement according to FIG. 3. However, the level changing stage for the applying of the holding voltage and for its disconnection is designed in another way. During operation addressing, the transistor T17 is cut off as earlier and so are the rest of the transistors T12, T13, T14 and T15. When operating, the transistor T8 delivers current through the output Y of the control circuit to the relay. When, according to what is mentioned above, the voltage +E1 disappears from the card mark input CM, the transistor T8 is cut off and the operation voltage +E1 on the output Y of the control circuit drops. The inductance of the relay then strives to hold current through the relay winding in the same direction as earlier. Thus, there is induced across the relay winding an electromotive force having the negative polarity towards the output of the control circuit. The inductance then drives current through the diode D4 whose anode is connected to the voltage source —E2 and further through the base-emitter-diode of the transistor T15. So the thyristor is turned on, i.e. the transistor T14 also conducts and transfers ground potential to the output of the control circuit.

When disconnection addressing occurs, as earlier the transistor T17 conducts and so do the transistors T12 and T13. The transistor T13 once conducting short-circuits the base-emitter junction of the transistor T15. This transistor does not receive any base-current and accordingly is cut off. The transistor T14 is also cut off and the holding current to the relay drops. In the same way as earlier the inductance of the relay now strives to pull current through the relay in the same direction as earlier and a current path through the diode D4 and the transistor T13 is now available. In this circuit the energy being stored in the inductance is dissipated and the current decreases towards zero. The advantage with this embodiment of the level changing stage is that the power consumption in the transistor T15 during the disconnection phase is lower.

Figure 5:
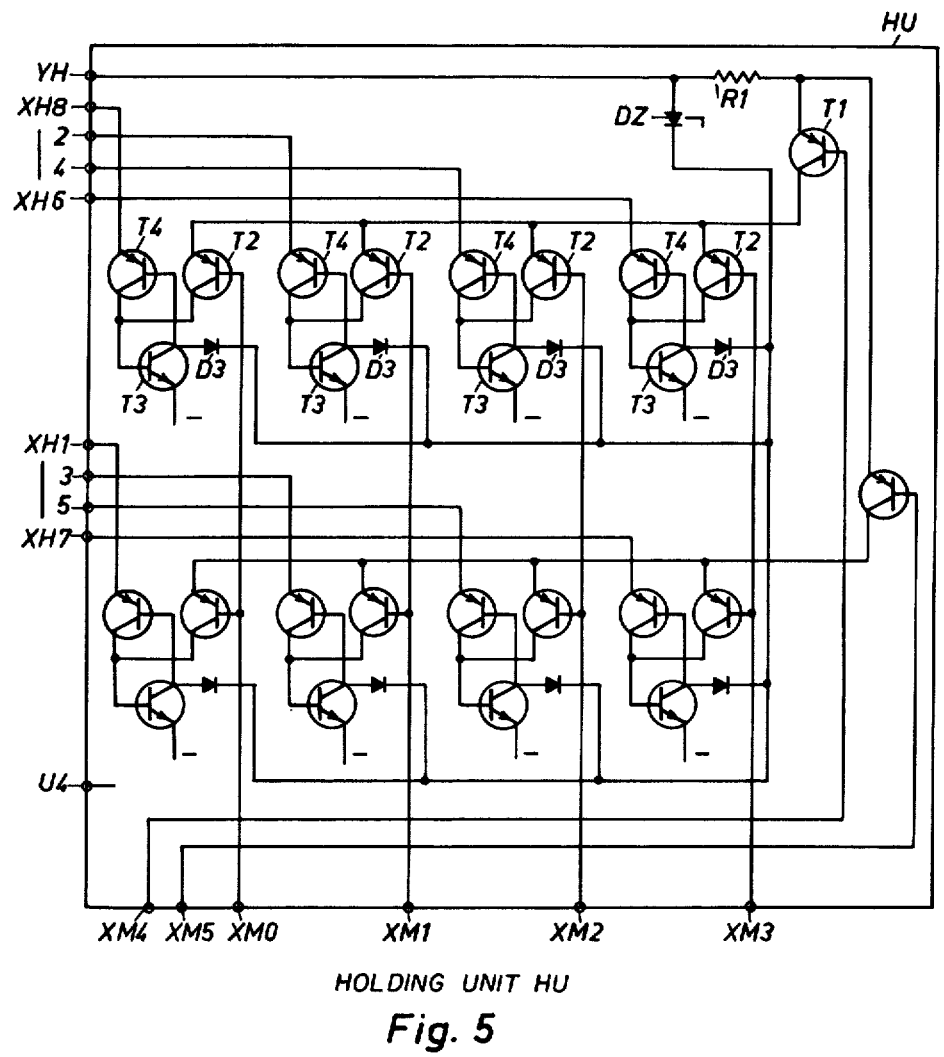
FIG. 5 shows an embodiment of the holding unit designed with holding circuits according to FIG. 3.

In FIG. 5 an embodiment of the holding unit comprising holding circuits according to FIG. 3 is shown. The eight holding devices for one row in the crossing point network have been grouped in two rows. In the upper row symbols of included components have been indicated. These are the same as the symbols of the corresponding components according to FIG. 3.

Figure 6:
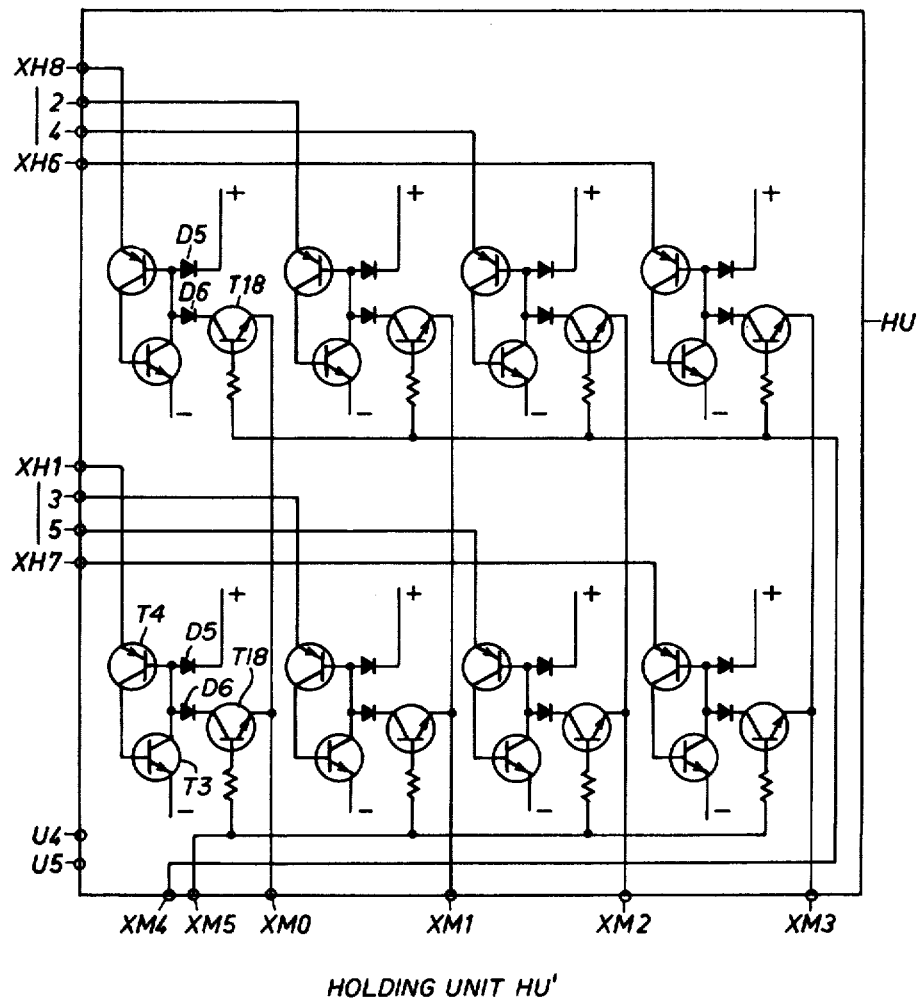
FIG. 6 shows a second embodiment of the holding unit.

In FIG. 6 a second embodiment of the holding unit HU' is shown. As in FIG. 5 the base-emitter resistors in the thyristor equivalent have been omitted in the figure. Symbols regarding the components associated with a typical crossing point have been marked in the figure. In particular, the transistors in the thyristor equivalent have been marked with the same reference characters as in FIG. 3. Conductor symbols which are terminated with a plus sign are intended to be connected to the voltage feeding terminal U5 of the circuit and conductor symbols which are terminated with a minus sign are intended to be connected to the voltage feeding terminal U4. As earlier the external voltage —E2 is connected to the voltage feeding terminal U4 and the external voltage +E1 is connected to the terminal U5. In this embodiment the thyristor of the chosen crossing point is effected by the relay current when a voltage of 0 volt is applied to the base of the PNP-transistor. However, the thyristor does not conduct until the relay current has grown to the holding current value for the thyristor. At that instant the relay current passes through the base-emitter resistor junction of the transistor T4, the diode D6 and the transistor T18 towards ground. Thus the holding unit in this embodiment lacks the special input YH according to FIG. 3. The condition of the input from the control unit to the control logic of the holding circuit consequently comes through the relay coil. The holding circuit within the holding unit is chosen in the same way as earlier by an address on the relay mark inputs XM. When addressing for instance crossing point 1 the voltage +E1 is implied on the relay mark input XM5 and the voltage 0 volt on the relay mark input XMO. When disconnecting, the thyristor being cut off, the relay coil is short-circuited through the input XH1, the base-emitter junction of the transistor T4, the diode D5, to the voltage source +E1. By the shown connection of the diode D5 it is also achieved that, when having a transient disturbance that interrupts the current to the thyristor, the thyristor once again conducts when the current returns.

Figure 7:
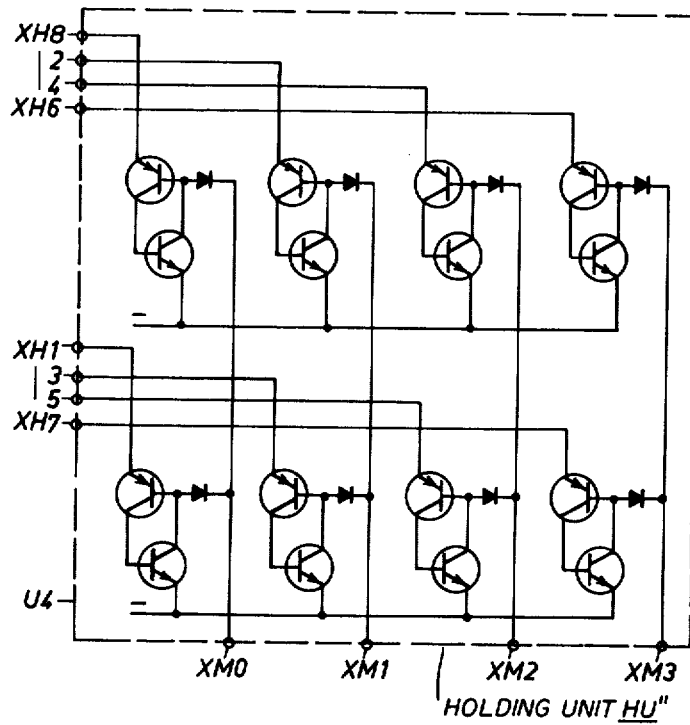
FIG. 7 shows the holding unit according to FIG. 6 arranged for use in a certain kind of matrix organization.

In FIG. 7 a holding unit HU'' similar to the one in FIG. 6 is shown. This holding unit is arranged for a part of the crossing point network consisting of 4×4 matrix of relays. Also in this figure the base-emitter resistors of the transistors in the thyristor equivalents are omitted. This embodiment of the holding unit, which also can be used in, for instance, crossing point networks with 8 or 16 columns, has a particularly simple decoding logic consisting of the diodes connected to the thyristor equivalents. In this embodiment as in the embodiment according to FIG. 6 the thyristors do not conduct until the relay current exceeds the holding current value of the thyristors.

Figure 8:
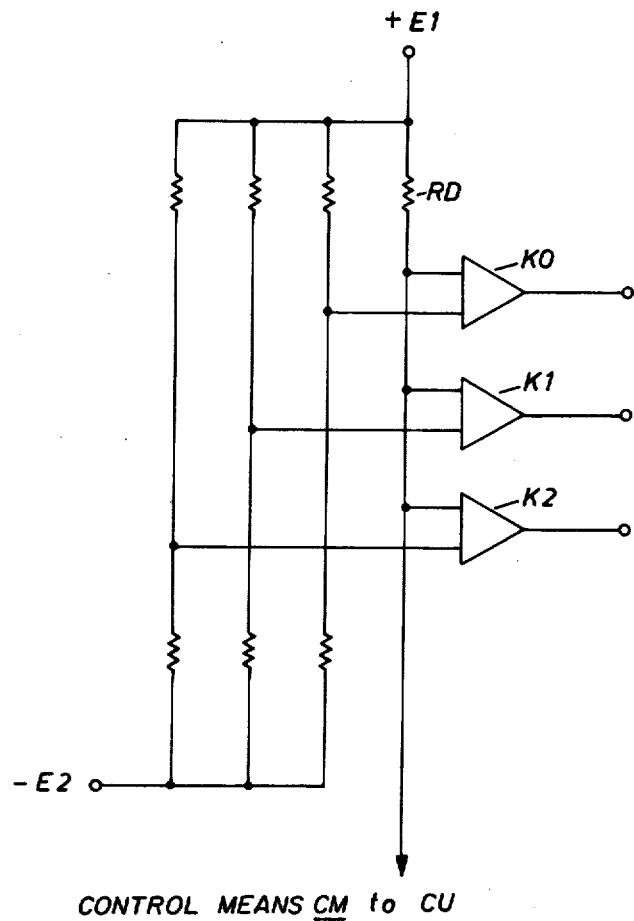
FIG. 8 shows an embodiment of a control circuit according to FIG. 2.

In FIG. 2 there has been shown how the operation voltage +E1 is connected to the control through a sensing resistor RD in order to create a current dependent voltage-drop for detecting purposes. As appears from the description above there are no control functions enclosed in the different circuit units. Instead the organization of the arrangement has been carried out so as to be able to determine whether the operation current has the proper value. In FIG. 8 an embodiment of a control unit is shown. This control means contains the sensing resistor and detection arrangements. The control means draws current from the voltage source +E1 only when activated by a signal on the card mark input CM. Two comparators K1, k2 are arranged to receive on one of their inputs the current dependent voltage and to receive a reference voltage on their other inputs. The comparators are adjusted in such a way that the comparator K1 gives signals on its output if the current through the sensing resistor is higher than the lowest operating current and the comparator K2 gives signals on its output if the current is higher than the highest operating current for one crossing point relay.

A control cycle can, for the above given conditions, be performed in the following way, for example. At first the control circuit of interest is activated for operation but no marking information, i.e. no address is given to the holding circuits. If the comparator K1 then signals on its output then probably a relay in the row that has been pointed out already is operated and another operating relay most probably would give a cut-in on the call similar to the one described above. This part of the control cycle takes about 1 ms owing to the time constant of the relay coil. By means of the signal from the comparator K1 release control is done and a new operating check performed in order to see whether the fault is permanent or not.

If the comparator K1 does not signal as described above marking information, i.e. an address, is fed to the holding circuits. A crossing point relay shall now receive operating current and the comparator K1 shall signal. If, however, the comparator K2 also signals on its output most probably there is a double marking and a release order is given.

In the embodiment of the control circuit here described the comparator K2 possible could be used to protect the circuits from overload, for instance, when there is a short-circuited relay winding. The output signal from the comparator in this application immediately and unconditionally would inhibit the signal from the card mark decoder.

The first phase of the control cycle, i.e. when by means of the comparator K1 it is decided if a relay in the row that has been marked is already operating, can be considerably sped up. A third comparator K0, receiving on its inputs the current depending voltage generated by the resistor RD as well as a reference voltage of its own, is adjusted in such a way that it delivers an output signal for currents higher than the minimum holding current for a relay. On the condition that a relay in the marked row already takes holding current, this holding current is directly transferred to the operating voltage source +E1 when an operation order is given. And so an immediate indication on the fact that a relay in the row is already operating is obtained.

The reference voltages to the respective comparator can be generated by means of a voltage divider between the external voltage sources +E1 and −E2 as is shown in the Figure.

Figure 9:
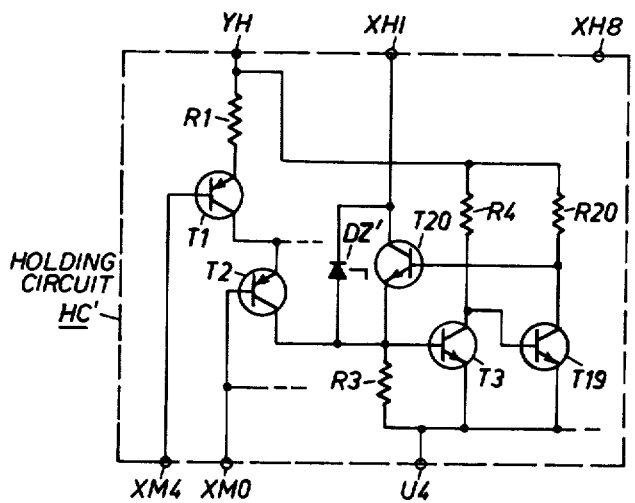
FIG. 9 shows an embodiment of the part of a holding unit HU which is associated with one crossing point.

In FIG. 9 an embodiment of the part of a holding unit HU belonging to a crossing point is shown. The manner of addressing is the same as in the arrangement according to FIG. 3. The transistors T1, T2 and the resistor R1 correspond directly to the components with the same reference numerals in FIG. 3. The holding device in this embodiment is not composed of a PNP-NPN thyristor equivalent but designed with NPN transistors T3, T19, T20. The transistor T3 is made conducting by operation addressing in the same way as in the arrangement according to FIG. 3. So the transistor T19 is cut off and the transistor T20 conducts. Thus the relay current can flow through the transistor T20 and the resistor R3 towards the voltage source −E2 connected to the voltage feeding terminal U4. The relay current through the resistor R3 keeps the transistor T3 conducting and consequently the transistor T20.

When passing to holding state the circuit remains in the described state.

Release addressing cuts the relay current from the control circuit C1. When the relay current has decreased below the holding current value for the arrangement, which can be affected by the choice of the resistor R3, the transistor T3 cuts off and consequently also the transistor T20. When the holding device has cut off the relay current decreased towards zero through a Zener diode DZ' individual for each holding device. The Zener diode DZ' shunts the collector-emitter junction of the transistor T20.

Figure 10:
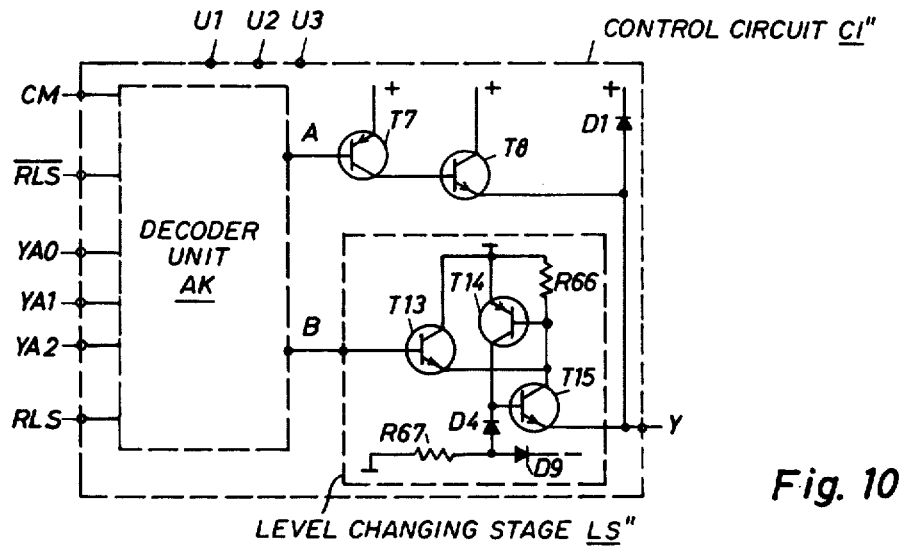
FIG. 10 shows a circuit diagram of a third embodiment of the control circuit.

In FIG. 10 a circuit diagram of a third embodiment of the control circuit is shown. The decoder unit AK within the dashed frame can be realized in the same way as in the embodiment according to FIG. 4. The decoder unit AK has two binary outputs A and B, which depend on the input signals in the same way as in the embodiment according to FIG. 4 to assume their high and low values respectively. The base-emitter shunt resistor R66 mainly determining the holding current of the PNPN-device T14-T15 has been drawn in the level changing step LS''. The resistance value of the shunt resistor has been chosen so that the holding current of the PNPN-device will be of the same order of magnitude as one of the relays in the associated row. Thus short disturbances do not cause operation or release of the relay, since the current due to the relay inductance cannot quickly grow and diminish respectively with respect to the holding current value of the PNPN-device.

The transistor T13 that shunts the base-emitter junction of the transistor T14 as well as the PNPN-device T14-T15 are kept cut off by operation addressing. When there is a switch-over to the holding state according to the previous description the operation voltage +E1 of the output Y drops. Then the relay inductance draws current through the diode D4 and the resistor R67 from ground. The common point of the resistor R67 and the diode D4 is then held by means of the clamping diode D9, connected to the voltage source −E2 at a voltage exceeding the voltage −E2 by a forward voltage drop of a diode in order to limit the voltage of the cathode of the PNPN-device T14-T15. This arrangement prevents the appearance of substrate currents in unmarked holding devices connected to the same control circuit output Y. When the relay takes current according to what is mentioned above the thyristor is turned on and transfers ground potential to the output of the control circuit and the relay is held. By release addressing, the output B assumes a high level whereby the transistor T13 conducts and short-circuits the base-emitter junction of the transistor T14 and accordingly this transistor does not receive any base-current any more and consequently is cut off. When transistor T14 is cut off the relay current through the trnasistors T13 and T15 decreases towards zero.

Figure 11:
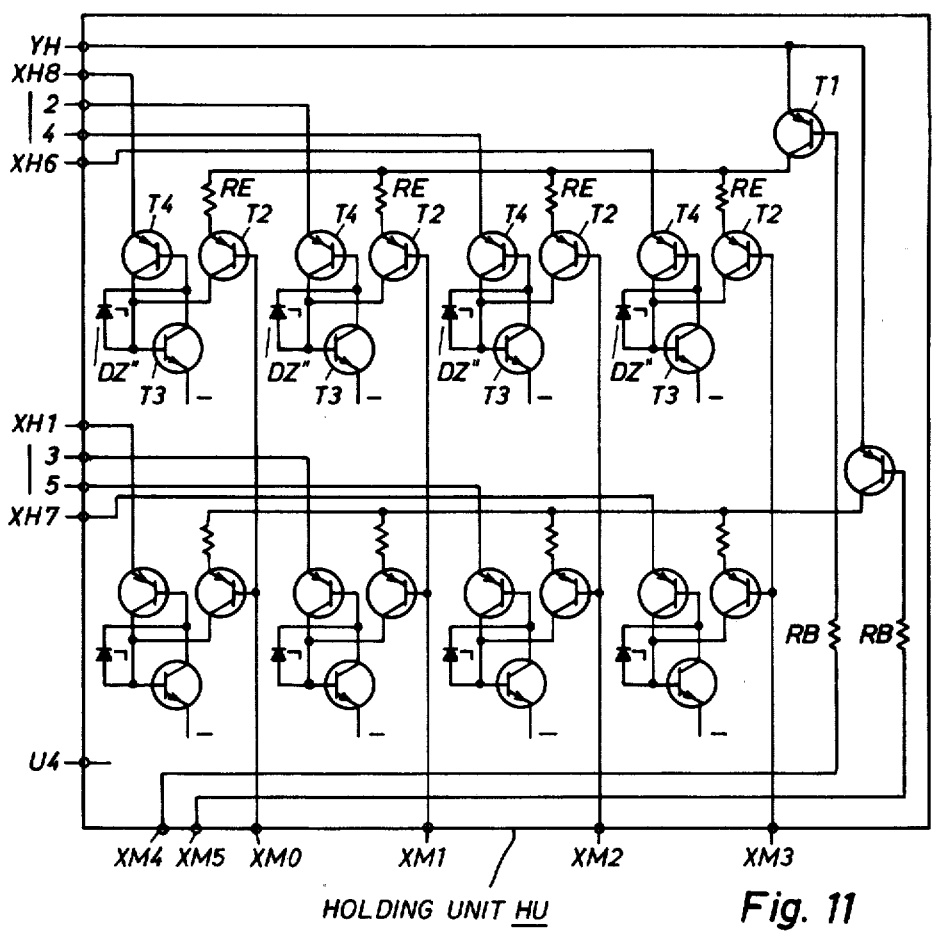
FIG. 11 finally, shows a modification of the holding unit according to FIG. 5.

The holding unit for a matrix row of 8 crossing point elements shown in FIG. 11 is a modification of the circuit according to FIG. 5. When there is a a double marking in the holding unit according to said Figure, i.e. when two crossing points, for instance, owing to an error in the control processor at the same time are addressed for operation on the inputs XM0-XM5, most probably only one of the crossing points will be activated. Furthermore, chance determines which of the two crossing points that will be activated. This depends on which of the the thyristors T4-T3, because of differencies in the component parameters, first becomes conducting via the collector-emitter junction of the marked transistor T2 and reduces the voltage of the collector of the transistor T1. In this the feeding of control current to the other marked thyristor is prevented. Thus it will not be possible to detect the error in the control processor with the control circuit according to FIG. 8. At the same time there is a risk that the wrong crossing point is activated.

In order to eliminate the effect of mutual differencies between the component parameters of the PNPN-devices and of the transistors T1 and T2 respectively in the marking logic of the circuit according to FIG. 11, a number of equalizing resistors E have been inserted at the same time as the resistor R1 in the arrangement according to FIG. 5 has been eliminated. Consequently a resistor RB has been connected to the base of the respective transistor T1, and in the emitter-circuit of each transistor T2 a resistance RE has been inserted. In this way the control current to possibly double-marked crossing points will be evenly distributed and activation of both of the marked crossing points is insured. Consequently it will be possible to detect double-marking by means of a control circuit according to the main application.

A diode D3 for each holding device and a zener diode DZ common to all holding devices offer a current path, in the circuit according to FIG. 5, through which, after release addressing, the relay current can decay with the PNPN-device being cut off. The functions of the above-mentioned two diodes have been taken over here by an individual zener diode Z'DZ'' per PNPN-device. This zener diode is connected, as is shown in FIG. 11, between the bases of the thyristor equivalent for limiting the voltage across the PNPN-device. If a transient disturbance should shunt away the current from the PNPN-device T4–T3 during holding conditions, the PNPN-device will refired due to the fact that the current because of the relay inductance, is forced through the base-emitter junctions of the PNPN-device and through the zener diode DZ'' when the disturbance has ceased. The refire occurs if the relay current has not decreased below the holding current of the PNPN-device during the disturbance.

We claim:
1. A relay matrix comprising: a plurality of relays arranged in rows and columns, each of said relays having first and second energizing terminals; a plurality of row conductors, each associated with a row of relays, each of said row conductors being connected to the first energizing terminal of each relay of the respective row; a plurality of bistable switching means, each having first and second current transfer terminals and a control terminal, each of the first current transfer terminals of each of said bistable switching means being connected to a reference voltage, each of the second current transfer terminals of each of said bistable switching means being connected to the second energizing terminal of a different one of said relays respectively; row selection means for selectively applying an energizing voltage to a selected one of said row conductors; and column selection means for selectively applying a control signal to the control input of a selected one of said bistable switching means for initiating current conduction through said bistable switching means during the presence of an energizing voltage on the associated row conductor.

2. The relay matrix of claim 1 further comprising means for measuring the current is a row conductor to indicate the number of relays of the associated row which are energized at given times.

3. The relay matrix of claim 1 wherein each of said bistable switching devices is switched from a state of low conductivity to a state of high conductivity when the voltage across its current transfer terminals is greater than a given value and a control signal is applied to its control input, said bistable switching device thereafter only switching to the state of low conductivity when a holding current flowing through said device falls below a given value and holding means for controllably and selectively applying the holding current to said row conductors.

4. The relay matrix of claim 3 wherein each of said bistable switching means comprises a four layer semiconductor having first and second PN junctions and a first and second resistor respectively bridging said first and second PN junctions, the first of said resistors determining the required holding current.

5. The relay matrix of claim 3 wherein each of said bistable switching means comprises a first bipolar transistor of the NPN type and a second bipolar transistor of the PNP type, means for connecting the base of the first transistor to the collector of the second transistor, means for connecting the base of the second transistor to the collector of the first transistor, first resistance means interconnecting the base and emitter of said first transistor, and second resistance means interconnecting the base and emitter of said second transistor.

6. The relay matrix of claim 3 wherein said holding means comprises a plurality of decoding units each associated with a different row conductor and adapted to receive a coded combination of signals for energizing the holding unit.

7. The relay matrix of claim 6 wherein each of said decoding units comprises a transistor having a base, a plurality of emitters and a collector wherein said base and emitters are adapted to receive the coded combination of signals.

8. The relay matrix of claim 6 further comprising a plurality of voltage level shifting means, each connected between one of said decoding units and its associated row conductor.

9. The relay matrix of claim 8 wherein each of said voltage level shifting means comprises a four layer semiconductor.

10. The relay matrix of claim 4 further comprising a plurality of Zener diodes each having a first terminal connected to a different one of said row conductors and a second terminal, a plurality of diodes, each of said diodes having a first terminal connected to the N layer of said first PN junction and having a second terminal connected to the second terminal of the Zener diode of its associated row conductor.

11. The relay matrix of claim 8 further comprising means interposed between each of said decoding units and its associated level shifting means for switching the level shifting means to a nonconducting state when the associated decoding unit receives a particular coded combination of signals.

12. The relay matrix of claim 1 wherein said column selector means comprises first means for selecting one group of a plurality of groups of bistable switching means and second means for selecting one bistable switching means from each group, said first and second means being adapted to receive selection signals whereby a particular bistable switching means in a particular group is selected for receiving a control signal.

* * * * *